(12) United States Patent  
Conrad et al.

(10) Patent No.: US 7,609,905 B2
(45) Date of Patent: Oct. 27, 2009

(54) METHOD AND ARRANGEMENT FOR IMAGE REPRESENTATION OF TWO-DIMENSIONAL IMAGE DATA

(75) Inventors: Annette Conrad, Kempten (DE); Gregor Niewalda, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 651 days.

(21) Appl. No.: 11/281,802

(22) Filed: Nov. 17, 2005

(65) Prior Publication Data

US 2006/0126910 A1 Jun. 15, 2006

(30) Foreign Application Priority Data

Nov. 17, 2004 (DE) .................. 10 2004 055 473

(51) Int. Cl.
*G06K 9/40* (2006.01)
*G09G 5/00* (2006.01)

(52) U.S. Cl. .................. 382/254; 345/156; 345/581; 345/619

(58) Field of Classification Search .................. 382/128, 382/254–275; 345/1.1, 156–184, 581, 619
See application file for complete search history.

(56) References Cited

U.S. PATENT DOCUMENTS

| 5,233,414 | A | * | 8/1993 | Kojima | ...................... 358/518 |
| 5,542,003 | A | * | 7/1996 | Wofford | ...................... 382/132 |
| 2002/0039084 | A1 | * | 4/2002 | Yamaguchi | .................. 345/1.1 |
| 2002/0065684 | A1 | | 5/2002 | Schwalb et al. | |
| 2002/0109735 | A1 | | 8/2002 | Chang et al. | |
| 2002/0136466 | A1 | * | 9/2002 | Yata et al. | .................... 382/282 |
| 2003/0194057 | A1 | * | 10/2003 | Dewaele | ..................... 378/210 |

FOREIGN PATENT DOCUMENTS

DE 195 41 301 C1 6/1997

OTHER PUBLICATIONS

"Digital Image Processing—A Systems Approach,"—Green (1989) pp. 142-145.
"3D-Exploration von Volumendaten," Jahnke (1988).

* cited by examiner

*Primary Examiner*—Aaron W Carter
(74) *Attorney, Agent, or Firm*—Schiff Hardin LLP

(57) ABSTRACT

In a method and an arrangement for image representation of two-dimensional digital image data acquired via a medical diagnostic modality, whereby a processing only in a region of the entire image of an electronic representation of the image data can be shifted within the entire image by the viewer for better recognition of image details.

20 Claims, 2 Drawing Sheets

METHOD AND ARRANGEMENT FOR IMAGE REPRESENTATION OF TWO-DIMENSIONAL IMAGE DATA

BACKGROUND OF THE INVENTION

1. Field of the Invention

The present invention concerns a method and an arrangement for image representation of two-dimensional digital image data acquired via a medical diagnostic modality.

2. Description of the Prior Art

The representation of image data that have been acquired via a medical diagnostic modality is an important and widespread basis for medical examination. Detection of relevant details of this representation is a complex task that requires extensive experience.

In the electronic representation of digital image data, particularly on a display screen, diverse possibilities are generally known to make the details more recognizable. Known possibilities include changing the contrast level, changing of the resolution, changing the image size as well as post-processing of the image data to filter image errors or for analysis of image elements such as contours.

SUMMARY OF THE INVENTION

An object of the present invention is to make the detection of details easier in an electronic representation of two-dimensional image data.

The above object is achieved in accordance with the present invention by a method for image representation of two-dimensional digital image data acquired using a medical diagnostic modality, such as an x-ray imaging modality, wherein an electronically processable representation of the entire image corresponding to the image data is displayed, and wherein electronic processing is undertaken in a region of the representation, with the electronic processing in that region differing in comparison to electronic processing of a remainder of the entire image, and wherein a viewer/operator can shift the region within which the different electronic processing takes place over the entire image.

By limiting the different processing only to a region of the displayed representation while still displaying the entire image, targeted, specific details can be emphasized that are more recognizable. By viewer-controlled shifting of the different processing throughout a specific segment of the entire image, various image impressions can be acquired and compared with one another in a direct sequence to detect further details. Due to the shifting in accordance with the invention, the user/viewer can repeatedly shift back and forth in the segment, such that given a sufficiently rapid movement the image impressions become superimposed (overlap) in the perception of the viewer. Through this superimposition, the inventive method offers a further possibility for detection of details. Moreover, an advantage is achieved in the search for medical image features that, for example, indicate a tumor, by changing the segments of the entire image.

For particularly user-friendly operation, shifting of the different processing is done via a computer mouse is provided, whereby a movement of the computer mouse corresponds to the shifting of the processing. In another embodiment, a touch-sensitive representation device, for example a known touchscreen, can be used, allowing the user to control the shifting of the different processing via a touch movement on the representation device.

The flexibility of the method can be increased in an embodiment wherein the different processing takes the form of a specific shape and/or size of the region. This affords possibility of allowing the viewer to adapt the processing to the segment or to the shape and/or size of the detail to be detected.

In a further embodiment the different processing takes the form of a transition at the boundary of the region to the rest of the region. This transition can be used for detection of details. Among other things, through this transition the representation processing can be varied in terms of its degree of processing at a narrowly-limited area by shifting the transition over this area.

In further embodiments of the invention, various advantageous types of processing are used. Any of variation of the brightness, variation of the contrast, variation of the sharpness, gamma correction and grey value spreading can be used. These processing techniques are known from digital image processing. The aforementioned types of the processing can be combined for optimization of the representation in the region, also with further processing techniques known from digital image processing.

In digital image processing, grey value spreading means a transformation of grey values of digital image data by utilization of the grey value scale to the full extent.

DESCRIPTION OF THE PREFERRED EMBODIMENTS

Figure 1:
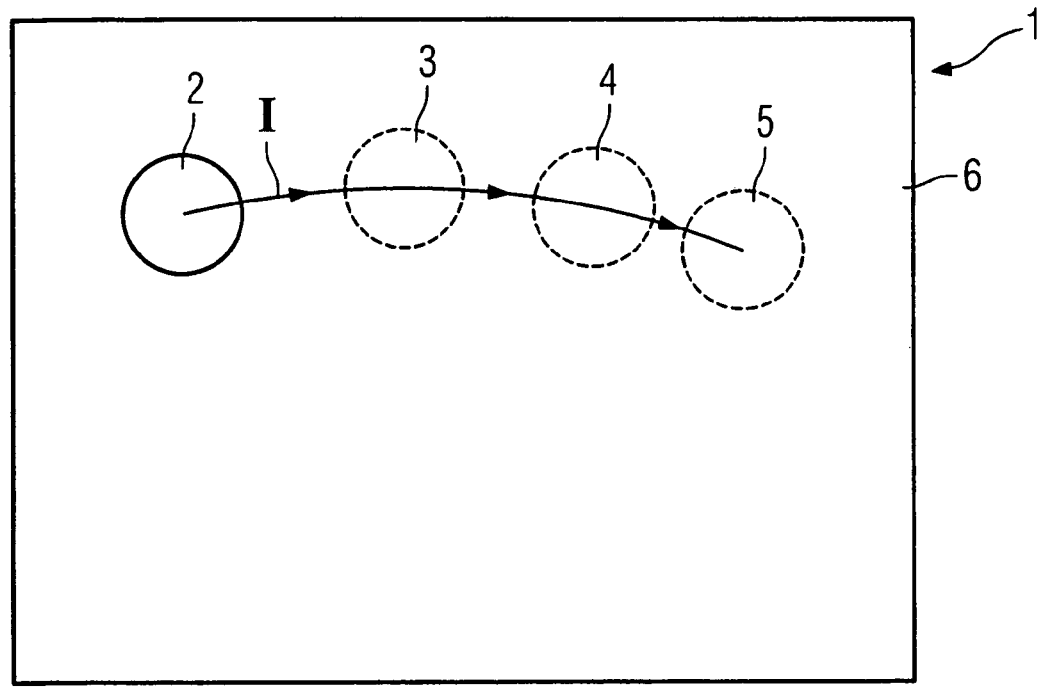
FIG. 1 schematically illustrates representation of the entire image with processing only of a region thereof, as well as shifting of the processing in accordance with the invention.

FIG. 1 shows an electronically processable representation 1 of an entire image 6 forward by two-dimensional image data. The representation 1 is only indicated by its rectangular contour for a better overview. According to the inventive method, electronic processing of the representation 1 only in a region 2 of the entire image 6 initially ensues, which processing differs in comparison to that of the rest of the remaining image 6. In a further method step, this processing is displaced (shifted) within the entire image 6 along a displacement curve I.

During the shift, the different electronic processing occurs in continuously changing intermediate regions 3, 4, and 5 (indicated by example in FIG. 1 as dashed circles) that correspond to the sub-region 2 in shape and size. The different electronic processing always ensues only in the region 2 and/or the intermediate regions 3, 4 and 5 (corresponding to the current shift position along the displacement curve I) relative to an unprocessed representation of the entire image 6.

Figure 2:
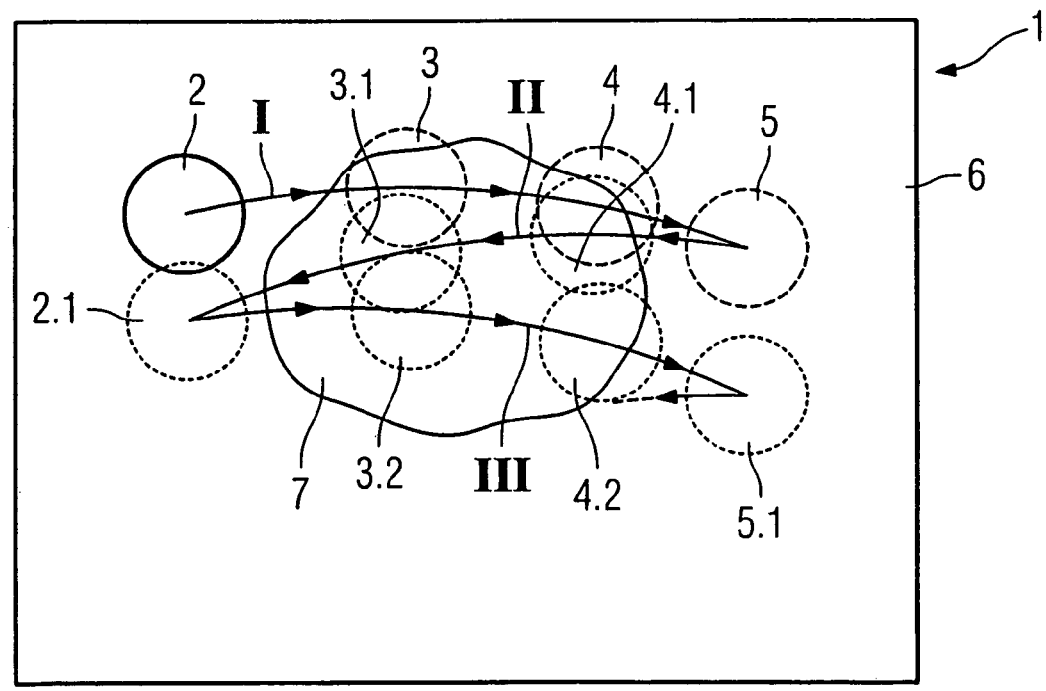
FIG. 2 shows the representation according to FIG. 1 with a back-and-forth shifting of the processing throughout a specific segment.

FIG. 2 shows the representation 1 according to FIG. 1, wherein the processing, as a continuation of the displacement curve I, is shifted back and forth corresponding to the displacement curves II, III throughout a specific segment 7. Further intermediate regions 4.1, 3.1, 2.1, 3.2, 4.2 and 5.1 along the displacement curves II, III that are processed during the shifting are indicated in the drawing by way of example. As is indicated by the dashed continuation of the lower displacement curve III, the shifting of the processing within the segment 7 is not terminated and can be repeated arbitrarily often by a viewer.

Figure 3:
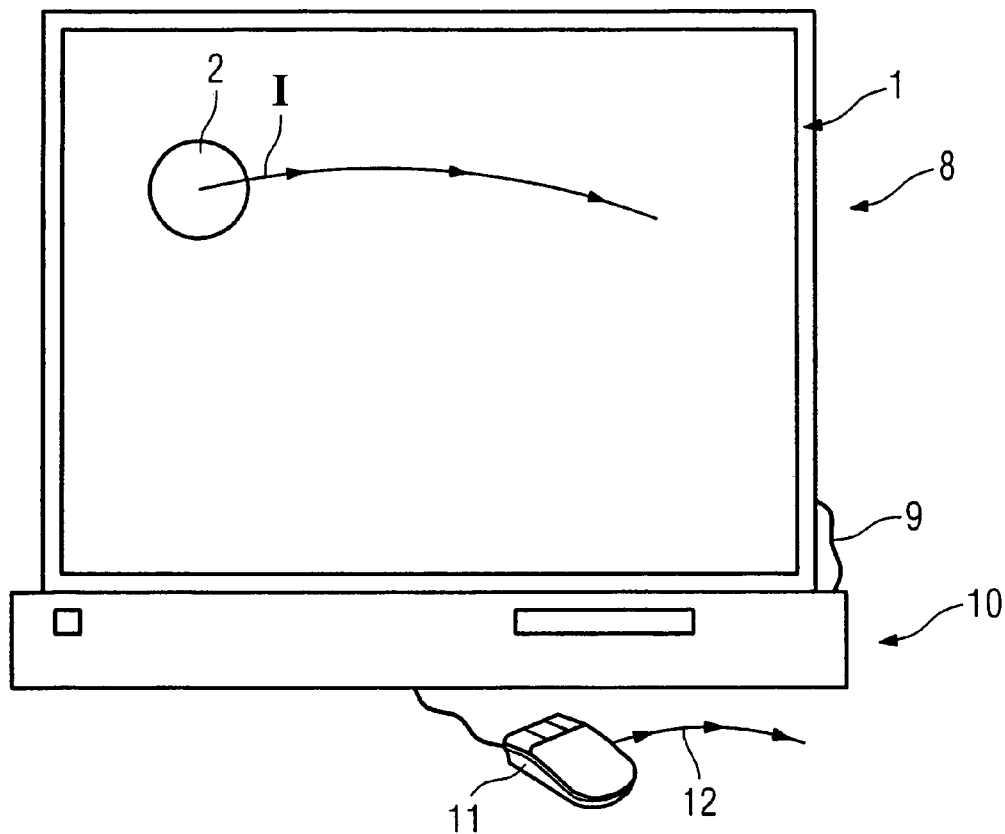
FIG. 3 shows an arrangement for implementation of the method using a computer, a computer screen and a computer mouse that is moved to shift the processing.

FIG. 3 shows an apparatus for implementation of the method explained using FIGS. 1 and 2. This apparatus has a computer screen 8 as an image representation device, a computer 10 as an image processing device and a computer mouse 11 connected to the computer 10 as a user input device. In this exemplary embodiment, the computer screen is connected with the computer via a connection cable 9. By movement 12 of the computer mouse 11, the viewer can control the shifting of the processing (illustrated by the displacement curve I) in a simple manner.

Figure 4:
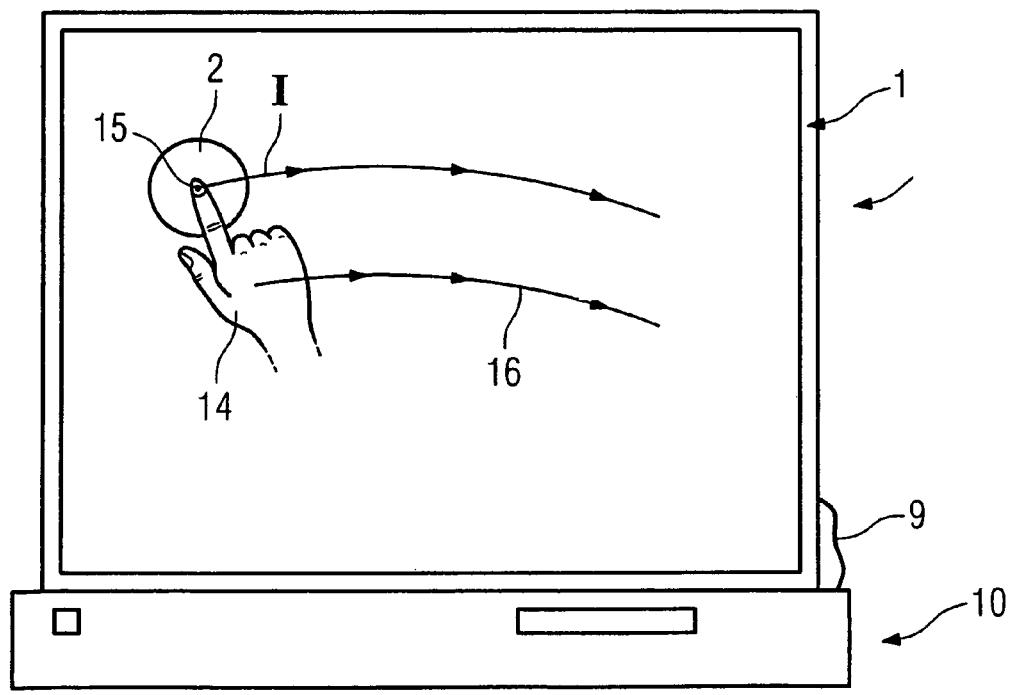
FIG. 4 shows the arrangement of FIG. 3 with a touch-sensitive computer screen wherein movement of the location of the touched contact shifts the processing.

FIG. 4 shows a further arrangement for implementation of the method that differs from the arrangement in FIG. 3 in that the viewer can control the displacement of the processing (shown by the displacement curve I) in a particularly simple manner via a touch movement 16 of his or her hand 14 contacting the computer screen 13 at a contact point 15; the computer mouse 11 shown in FIG. 3 is therefore not provided in this arrangement.

In summary, the invention concerns a method and an arrangement for image representation of two-dimensional digital image data acquired via a medical diagnostic method, wherein processing only in a region of the entire image of an electronic representation of the image data can be shifted within the entire image by the viewer for better recognition of image details.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for image presentation of two-dimensional digital data, comprising the steps of:

in a processor, generating an electronically processable representation of an entire image corresponding to two-dimensional digital image data, said representation including a visual representation characteristic selected from the group consisting of gamma correction and grey scale spreading;

from said processor, causing said representation of said entire image to be displayed at a display screen by processing said representation with a first degree of said visual presentation characteristic at said display screen that gives said entire image at said display screen a first visual appearance due to said gamma correction or prey scale spreading;

via an input unit connected to said processor, designating a region within said entire image, said region having an area contained within a boundary;

in said processor, electronically processing digital image data in said region differently from said digital image data representing said entire image with a second degree of said visual presentation characteristic that causes said digital image data in said region to have a second visual appearance at said display screen that differs from said first visual appearance due to said gamma correction or prey scale spreading; and via said input unit, manually shifting said region at said display screen within said entire image to move said region to different locations within said entire image and, in said processor, continually processing different image data contained within said region while said region is being moved within said entire image to continually change said first visual appearance to said second visual appearance as said region moves through said different positions in said entire image at said display screen, causing image data encompassed by said region to always have said second visual appearance.

2. An arrangement for image presentation of two-dimensional digital data, comprising:

a processor configured to generate an electronically processable representation of an entire image corresponding to two-dimensional digital image data said representation including a visual representation characteristic selected from the group consisting of gamma correction and grey scale spreading;

a display unit connected to said processor, said display unit having a display screen and said processor being configured to cause said representation of said entire image to be displayed at said display screen by processing said representation with a first degree of said visual presentation characteristic at said display screen that gives said entire image at said display screen a first visual appearance due to said gamma correction or grey scale spreading;

an input unit connected to said processor allowing designation of, a region within said entire image, said region having an area contained within a boundary;

said processor being configured to process digital image data in said region differently from said digital image data representing said entire image with a second degree of said visual presentation characteristic that causes said digital image data in said region to have a second visual appearance at said display screen that differs from said first visual appearance due to said gamma correction or prey scale spreading; and said input unit allowing manual shifting of said region at said display screen within said entire image to move said region to different locations within said entire image and, said processor being configured to continually process different image data contained within said region while said region is being shifted within said entire image to continually change said first visual appearance to said second visual appearance as said region moves through said different positions in said entire image at said display screen, causing image data encompassed by said region to always have said second visual appearance.

3. A method as claimed in claim 1 wherein the step of generating and displaying said electronically processable representation comprises generating and displaying an electronically processable representation of an entire image corresponding to two-dimensional digital image data acquired with a medical diagnostic modality.

4. A method as claimed in claim 1 comprising conducting said different electronic processing of said region in a computer, and activating said different electronic processing in said region via a computer mouse connected to the computer, and shifting said region over said entire image by movement of the computer mouse.

5. A method as claimed in claim 1 comprising generating and displaying said electronically processable representation of said entire image with a touch-sensitive image representation device, and shifting said region over said entire image by contact movement on a screen of said touch-sensitive image representation device.

6. A method as claimed in claim 1 comprising determining said area of said region in which said different processing occurs by selecting at least one of a shape of said region and a size of said region.

7. A method as claimed in claim 1 comprising conducting said different processing in said region with a boundary transition between said boundary of said region and a remainder of said region.

8. A method as claimed in claim 1 comprising conducting said different processing in said region with a brightness in said region that is different from a brightness of said remainder of said entire image.

9. A method as claimed in claim 1 comprising conducting said different processing in said region with a contrast in said region that is different from a contrast of said remainder of said entire image.

10. A method as claimed in claim 1 comprising conducting said different processing in said region with a sharpness in said region that is different from a sharpness of said remainder of said entire image.

11. An arrangement as claimed in claim 2 wherein said computer is configured to generate and cause display of said electronically processable representation of an entire image corresponding to two-dimensional digital image data acquired with a medical diagnostic modality.

12. An arrangement as claimed in claim 2 wherein said input unit is a computer mouse that activates said different electronic processing and shifts said region over said entire image by movement of the computer mouse.

13. An arrangement as claimed in claim 2 wherein said input unit comprises a touch-sensitive image representation screen of said computer, allowing shifting said region over said entire image by contact movement on said screen.

14. An arrangement as claimed in claim 2 wherein said input unit allows determination of said area of said region in which said different processing occurs by allowing selection of at least one of a shape of said region and a size of said region.

15. An arrangement as claimed in claim 2 wherein said computer is configured to conduct said different processing in said region with a boundary transition between a boundary of said region and a remainder of said region.

16. An arrangement as claimed in claim 2 wherein said computer is configured to conduct said different processing in said region with a brightness in said region that is different from a brightness of said remainder of said entire image.

17. An arrangement as claimed in claim 2 wherein said computer is configured to conduct said different processing in said region with a contrast in said region that is different from a contrast of said remainder of said entire image.

18. An arrangement as claimed in claim 2 wherein said computer is configured to conduct said different processing in said region with a sharpness in said region that is different from a sharpness of said remainder of said entire image.

19. An arrangement as claimed in claim 2 wherein said computer is configured to conduct said different processing in said region with a gamma correction in said region that is different from a gamma correction of said remainder of said entire image.

20. An arrangement as claimed in claim 2 wherein said computer is configured to conduct said different processing in said region with a grey value spreading in said region that is different from a grey value spreading of said remainder of said entire image.

* * * * *